United States Patent
Dreisinger (12) 
(10) Patent No.: US 8,741,238 B2
(45) Date of Patent: Jun. 3, 2014

(54) METATHETIC COPPER CONCENTRATE ENRICHMENT

(71) Applicant: Polymet Mining Corp., Richmond (CA)

(72) Inventor: David Bruce Dreisinger, Delta (CA)

(73) Assignee: Polymet Mining Corp., Richmond, B.C. (CA)

( * ) Notice: Subject to any disclaimer, the term of this patent is extended or adjusted under 35 U.S.C. 154(b) by 0 days.

(21) Appl. No.: 13/965,960

(22) Filed: Aug. 13, 2013

(65) Prior Publication Data

US 2014/0044617 A1    Feb. 13, 2014

Related U.S. Application Data

(63) Continuation of application No. 13/013,578, filed on Jan. 25, 2011, now abandoned.

(60) Provisional application No. 61/341,632, filed on Apr. 1, 2010.

(51) Int. Cl.
*B03D 1/00* (2006.01)

(52) U.S. Cl.
USPC .......................................... 423/26; 423/138

(58) Field of Classification Search
USPC ............................................................ 423/26
See application file for complete search history.

(56) References Cited

U.S. PATENT DOCUMENTS

| 3,616,331 | A | * | 10/1971 | O'Neill et al. | 205/584 |
| 4,283,017 | A | * | 8/1981 | Coale et al. | 241/20 |
| 2008/0173132 | A1 | * | 7/2008 | Dunn et al. | 75/399 |

* cited by examiner

*Primary Examiner* — Melissa Stalder
(74) *Attorney, Agent, or Firm* — Kilpatrick Townsend & Stockton LLP (57) ABSTRACT

In one aspect, the invention provides processes for producing an enriched copper concentrate from a copper-and-nickel-containing ore. Processes of the invention may include an initial step of comminuting the ore, to provide a ground ore comprising copper minerals and nickel minerals. The ground ore may be subjected to a floatation process, to separate the ground ore into distinct fractions, such as first and second concentrates. A first concentrate may for example be made up of copper-enriched-and-nickel-containing solids, while a second concentrate is made up of nickel-enriched-and-copper-containing solids. The floatation process may for example fractionate the ore so that the concentration of copper minerals is higher in the first concentrate than in the ore, and the concentration of the nickel minerals is higher in the second concentrate than the ore.

9 Claims, 2 Drawing Sheets

METATHETIC COPPER CONCENTRATE ENRICHMENT

CROSS REFERENCE TO RELATED APPLICATION

This invention claims the benefit of U.S. Provisional Patent Application No. 61/341,632, filed Apr. 1, 2010, the contents of which are incorporated herein by reference.

FIELD OF THE INVENTION

The invention is in the field of hydrometallurgy, and provides methods for processing of copper-nickel-cobalt sulphide ores that may contain precious metal values.

BACKGROUND OF THE INVENTION

Sulphide ores of copper-nickel-cobalt are normally treated by multi-stage crushing, grinding and flotation to produce separate copper and nickel-cobalt concentrates that may then be smelted. A wide variety of mineral processing procedures can be used to separate the copper and nickel containing minerals, such as chalcopyrite ($CuFeS_2$), cubanite ($CuFe_2S_3$), pentlandite ($Ni_{4.5}Fe_{4.5}S_8$) and pyrrhotite ($Fe_7S_8$) which are typically present in copper-nickel-cobalt-precious metal sulphide ores.

A typical grade of copper concentrate would be 25-35% Cu. If the grade of copper is low (for example less than 25% Cu) then the concentrate may be less desirable and may incur higher costs for smelting or alternately may not be accepted by smelters. It is thus generally desirable to maximize the grade of copper in the copper concentrate, and accordingly to produce copper concentrates having relatively low levels of nickel and cobalt. Elevated levels of nickel in copper concentrates, for example in the range of 0.2 to 1.0% Ni, may adversely impact copper anode refining processes. High levels of nickel in the copper anode may for example cause anode passivation during refining. In addition, nickel contained in copper concentrates is often not paid for by copper smelters.

Similarly, in the production of a nickel sulphide concentrates for nickel smelting, a minimum grade of at least 4% Ni is generally desirable, and higher Ni levels are often attractive. The Cu content of nickel concentrates may be significant, but generally it is desirable to have a Cu content less than that of Ni.

There are a very wide range of options for hydrometallurgical treatment of copper concentrates to extract metal values, including the Activox™ Process, the Albion™ Process, the CESL™ Process, the BIOCOP™ Process, the MINTEK-Bactech™ Biological Leaching Process, the Anglo American Corporation—University of British Columbia Process, the Galvanox™ Process, the Total Pressure Oxidation Process, the Dynatec™ Process and the PLATSOL™ process (Dreisinger, 2006). A number of chloride based processes are also available, including the INTEC™ Copper Process, the Outotec™ Hydrocopper Process and the Sumitomo Copper Process. These processes are generally adapted to leach copper and other metals (such as nickel, cobalt and zinc) from a sulphide ore or concentrate feed materials. The metals that are leached may then be recovered from solution using a wide range of downstream technologies for metal separation and recovery (for example solvent extraction and electrowinning of copper, nickel and cobalt). A similarly wide range of technologies is available for hydrometalurgical treatment of nickel sulphide concentrates, which may be adapted to dissolve nickel and associated metals from the sulphide ore or concentrate, to be followed by separation and recovery of individual metals.

U.S. Pat. No. 6,315,812 provides an example of hydrometalurgical processes for the treatment of ores or concentrates, and is a useful illustration of a process that may be appropriate for concentrates containing significant precious metal values, the PLATSOL™ process.

The PLATSOL™ process may be adapted to provide a one-step treatment of mixed copper-nickel-cobalt-platinum-palladium-gold concentrates, using total pressure oxidation in the presence of a halide salt (eg. sodium chloride). The chemistry of the PLATSOL™ process can be divided into the main chemistry of sulphide mineral oxidation and the minor (but economically significant) chemistry of precious metal extraction. The mineral forms of copper, iron, nickel, cobalt and precious metals may be complex and varied, depending on the genesis of the natural ore source. In a purely illustrative example, subjecting a concentrate to PLATSOL™ leaching may be understood to dissolve copper, nickel and cobalt, as the soluble metal sulphate salts, and platinum, palladium and gold as the chloro-complexed species, as shown below.

Sulfide Mineral Oxidation for Base Metal Extraction $$CuFeS_2 + 4.25O_2 + H_2O = CuSO_4 + 0.5Fe_2O_3 + H_2SO_4$$

$$FeS_2 + 3.75O_2 + 2H_2O = 0.5Fe_2O_3 + 2H_2SO_4$$

$$Fe_7S_8 + 17.25O_2 + 8H_2O = 3.5Fe_2O_3 + 8H_2SO_4$$

$$NiS + 2O_2 = NiSO_4$$

Precious Metal Extraction $$Au + 0.75O_2 + 4HCl = HAuCl_4 + 1.5H_2O$$

$$Pt + O_2 + 6HCl = H_2PtCl_6 + 2H_2O$$

$$Pd + 0.5O_2 + 4HCl = H_2PdCl_4 + H_2O$$

The recovery of precious metals from the PLATSOL™ process may be accomplished by a number of different routes. One route involves sequential reduction of any residual ferric sulphate present followed by reductive precipitation of precious metals on a synthetic copper sulphide precipitate, as shown below.

Ferric Reduction and Gold, Platinum and Palladium Precipitation $$Fe_2(SO_4)_3 + SO_2 + 2H_2O = 2FeSO_4 + 2H_2SO_4$$

$$2HAuCl_4 + 3CuS + 3H_2SO_4 = 2Au + 3CuSO_4 + 8HCl + 3S$$

$$H_2PtCl_6 + 2CuS + 2H_2SO_4 = Pt + 2CuSO_4 + 6HCl + 2S$$

$$H_2PdCl_4 + CuS + H_2SO_4 = Pd + CuSO_4 + 4HCl + S$$

Similarly, the recovery of copper, nickel and cobalt from the precious-metal free solution may be accomplished by a variety of technologies, including copper solvent extraction—electrowinning, nickel and cobalt precipitation.

SUMMARY OF THE INVENTION

In one aspect, the invention provides processes for producing an enriched copper concentrate from a copper-and-nickel-containing ore. These ores may for example include disseminated or massive sulphide ores of copper, nickel and cobalt. Processes of the invention may include an initial step of comminuting the ore, to provide a ground ore comprising copper minerals and nickel minerals, such as: CuS, covellite; Cu9S8 (Cu1.12S), yarrowite; Cu39S28 (Cu1.39S) spionkopite; Cu8S5 (Cu1.6S), geerite; Cu7S4 (Cu1.75S), anilite; Cu9S5 (Cu1.8S), digenite; Cu31S16 (Cu1.96S), djurleite; Cu2S, chalcocite; or, Copper-iron-sulfide minerals, such as the following: CuFeS2, Chalcopyrite; Cu5FeS4, Bornite; CuFe2S3, Cubanite; or, Nickel minerals with sulphur, such as: Ni3S4, Polydymite; NiS, Millerite; Ni3S2, Heazelwoodite; or, nickel-iron-sulphide minerals, such as: FeNi2S4, Violarite; Ni4.5Fe4.5S8, Pentlandite; Fe(Ni)7S8, Nickeliferrous; or Pyrrhotite.

The ground ore may be subjected to a floatation process, to separate the ground ore into distinct fractions, such as first and second concentrates (Wills' Mineral Processing Technology, Seventh Edition, 2006: An Introduction to the Practical Aspects of Ore Treatment and Mineral Recovery, Napier-Munn and Wills; The Winning of Nickel, 1967, J. R. Boldt). A first concentrate may for example be made up of copper-enriched-and-nickel-containing solids, while a second concentrate is made up of nickel-enriched-and-copper-containing solids. The floatation process may for example fractionate the ore so that the concentration of copper minerals is higher in the first concentrate than in the ore, and the concentration of the nickel minerals is higher in the second concentrate than the ore.

The nickel-enriched second concentrate from the floatation step may be subjected to one or more hydrometalurgical extraction(s), to extract, among other things, a copper-containing. This copper-containing leachate may then be used under metathetic leaching conditions to treat the first concentrate, so as to increase the concentration of copper, and decrease the concentration of nickel, in the copper-enriched-and-nickel-containing solids of the first concentrate. This metathetic leaching step thereby provides an enriched copper concentrate.

In alternative aspects of metathetic leaching optimization steps, the process may be optimized for maximum copper depletion (to remove as much copper as possible from the remaining nickel and cobalt in solution); alternatively, the process may be optimized for maximum enrichment (to optimize enrichment of the concentrate in copper). In alternative embodiments, the operating parameter may be selected on the basis of an overall economic optimization of the final outcome. In general, the requirements for the metathetic leach are to provide a suitable ratio of copper in solution to 'active' metals in the solid phase (eg. Fe, Ni, Co). In general, for copper removal, this number should be as low as possible (to maximize the driving force for removal of copper from solution). In general, for copper enrichment, this number should be as high as possible. Other parameters that may be adjusted in metathetic leaching steps are: Particle size—finer particles optimize leaching (in selected embodiments, generally less than 100 um and preferably in the P80 range of 5-30 um; Temperature—the kinetics will generally be controlled by solid state diffusion in the mineral phase (copper diffuses in and the other metals diffuse out), accordingly, temperature will generally be in the range of room temperature to boiling point (in alternative embodiments, to maximize kinetics, the temperature of metathetic leaching may be raised beyond the boiling point in a pressurized system); Time—in selected embodiments, the time for copper depletion/copper enrichment will typically be in the range of 2-12 hours, depending on other conditions.

In selected embodiments, the invention provides metathetic leaching steps that afford a relatively wide range of options for tailoring the outputs of a process to accommodate variability in earlier foatations steps. In this way, the overall process may be adapted for economic efficiencies by modulating the floatation parameters and the metathetic leaching parameters in concert. Processes of the invention may accordingly include steps of optimizing the combination of floatation and metathetic leaching parameters.

In various aspects, the invention relates to a combination of mineral processing steps (such as crushing/grinding/floatation) and hydrometallurgical treatments, which in combination may be adapted to produce a copper concentrate of improved quality. The enrichment of the copper concentration in the concentrate may, for example, facilitate subsequent steps, such as copper smelting.

At least one portion of nickel concentrate may be treated under conditions designed to leach base and precious metals. For example, adaptations of the PLATSOL™ process may be used (U.S. Pat. No. 6,315,812). In selected embodiments, precious metals (such as Au, Pt, Pd, Rh, Ir, Ru, Os, and/or Ag) may be leached from the concentrate using such a process, and may then be recovered, for example by precipitation on a reducing sulfide mineral (such as synthetic CuS).

Copper leached from the nickel concentrate, for example using PLATSOL™ conditions, may then be used to enrich the copper content of a copper concentrate by metathetic leaching, simultaneously displacing other metals from the copper concentrate, such as nickel, cobalt and iron. By this method, it has been found possible to synthesize a superior copper concentrate for smelting treatment.

In some embodiments, precious metals may be co-extracted at the same time as base metals in a primary hydrometallurgical step (such as an adaptation of the PLATSOL™ process). In this way, processes of the invention may be adapted to either recover the precious metals in a separate concentrate, or alternatively, in a metathetic leaching step, to allow the precious metals to precipitate with the copper into an enriched copper concentrate. In these embodiments, the invention provides an enriched copper-precious metal containing concentrate.

DETAILED DESCRIPTION OF THE INVENTION

Figure 1:
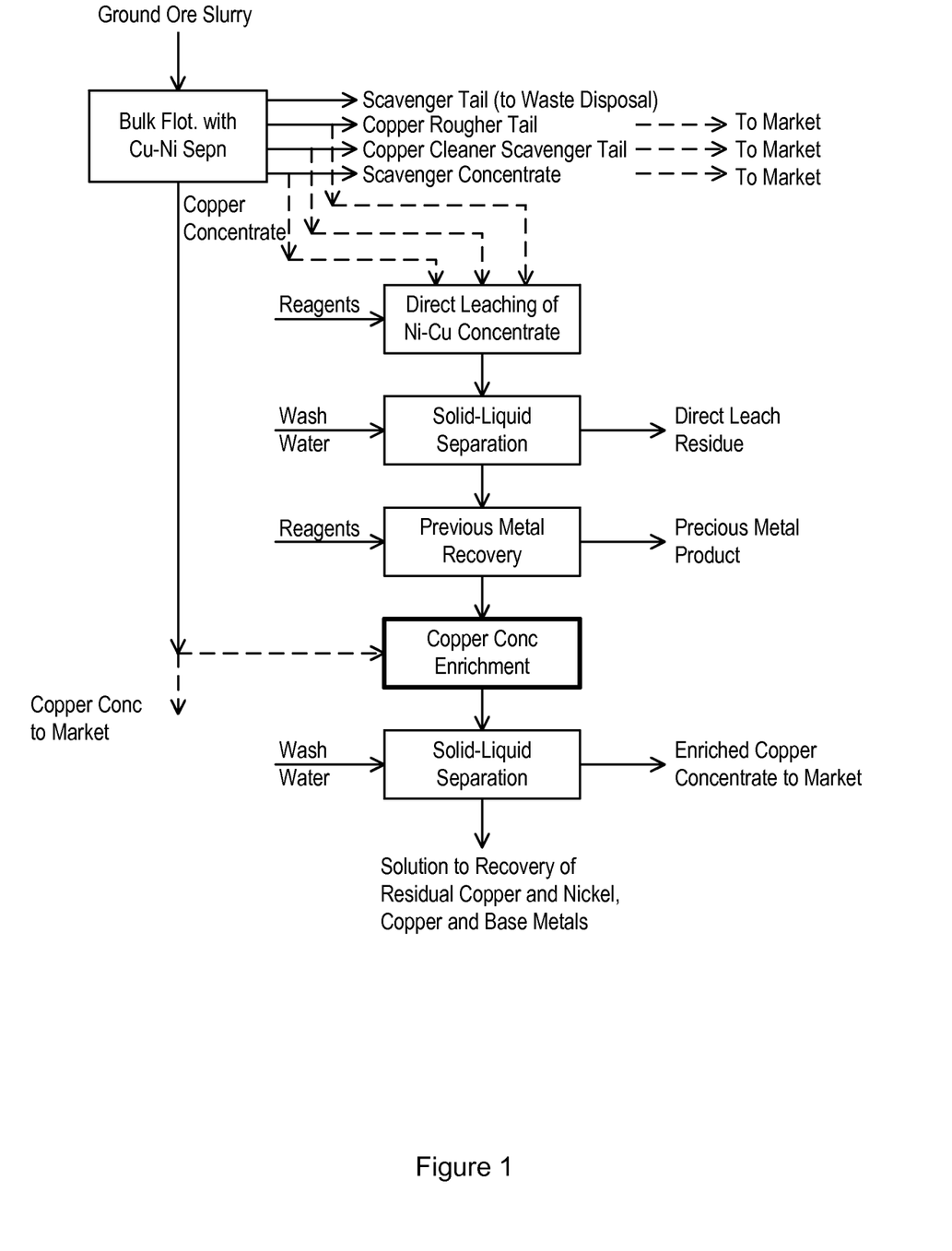
FIG. 1 is a flowsheet that shows the copper concentrate enrichment process in relation to a primary flotation process and the hydrometallurgical treatment of all or a portion of one or more of the nickel-copper concentrates under conditions designed to extract precious metals. The precious metals are recovered in this instance prior to the copper concentrate enrichment process.

FIG. 1 is a flowsheet illustrating an embodiment that provides a precious metal product separately from an enriched copper concentrate. In the illustrated embodiment, the flotation circuit is used to produce up to five products, including a copper concentrate, a scavenger tailing (to waste disposal), and a range of nickel containing products comprising a copper rougher tail, a copper cleaner scavenger tail and a scavenger concentrate. One or more of the nickel concentrates (in whole or in part) is then directed to the direct leaching process for the nickel-copper concentrate in order to extract nickel, cobalt and associated base metals and precious metals. The direct leaching residue is then separated from the leach solution, washed and discarded to waste. The leachate, containing nickel, copper and other base metals is then subjected to a precious metal recovery step in which the precious metals are substantially removed from solution. The precious metal free solution then advances to the copper concentrate enrichment process.

In the embodiment of FIG. 1, all or a portion of the copper concentrate derived from the bulk flotation is contacted with the precious metal free solution in order to enrich the copper concentrate by metathetic leaching. Examples of the chemical reactions corresponding to metathetic leaching are listed below. These putative reactions are illustrative of conditions that provide for the metathetic substitution of copper for any of iron, nickel and/or cobalt in the sulphide mineral solids. Other sulphide minerals, if present may also show similar replacement.

$$CuFeS_2 + CuSO_4 = 2CuS + FeSO_4$$

$$CuFe_2S_3 + 2CuSO_4 = 3CuS + 2FeSO_4$$

$$FeS + CuSO_4 = CuS + FeSO_4$$

$$Fe_7S_8 + 7CuSO_4 = 7CuS + S + 7FeSO_4$$

$$NiS + CuSO_4 = CuS + NiSO_4$$

$$Ni_{4.5}Fe_{4.5}S_8 + 9CuSO_4 = 8CuS + Cu + 4.5FeSO_4 + 4.5NiSO_4$$

$$CoS + CuSO_4 = CuS + CoSO_4$$

In alternative embodiments, metathetic leaching may take place in a chloride leach environment, in which copper chloride takes the place of copper sulphate in reactions analogous to the foregoing reactions.

Figure 2:
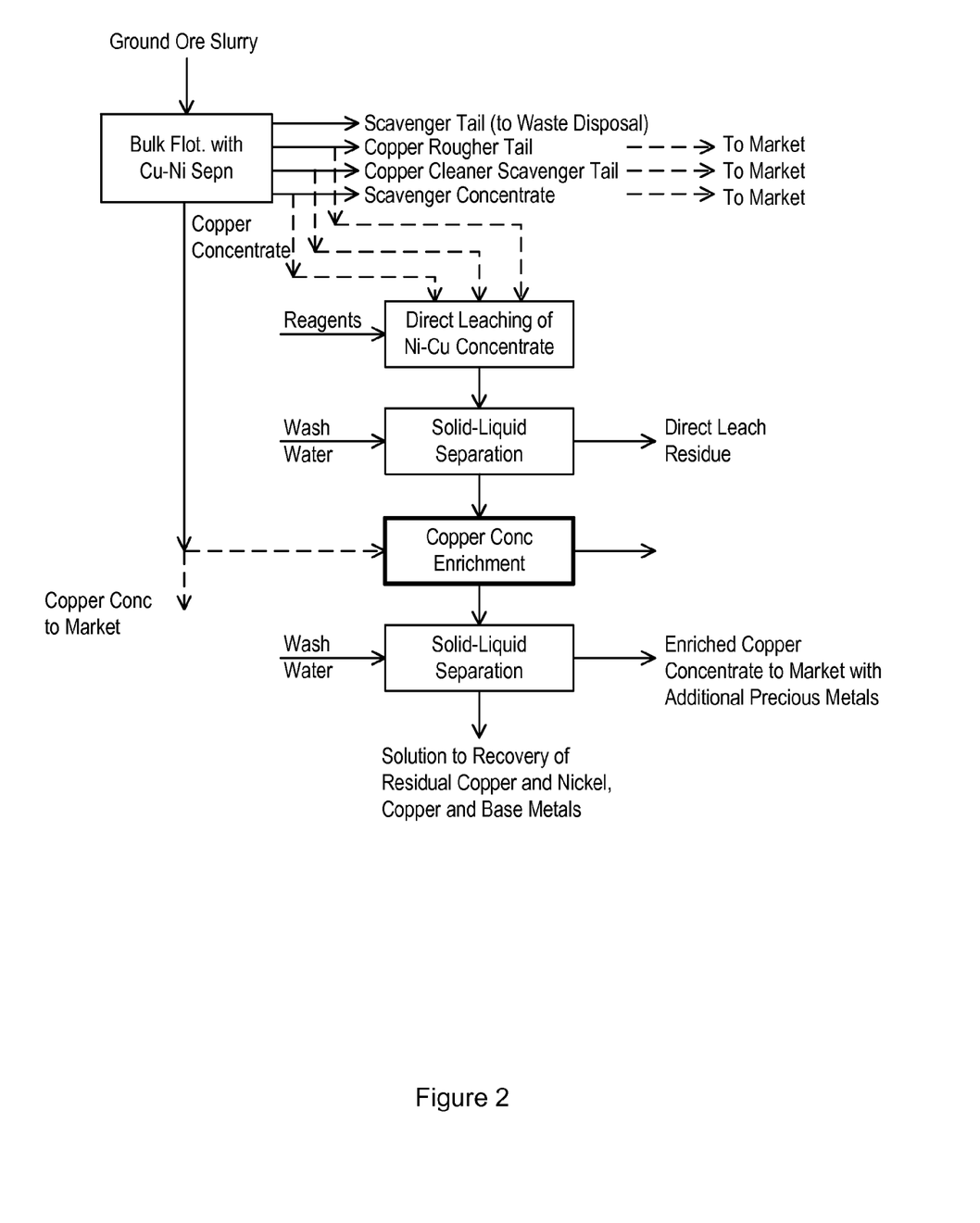
FIG. 2 is a flowsheet that shows the copper concentrate enrichment process in relation to a primary flotation process and the hydrometallurgical treatment of all or a portion of one or more of the nickel-copper concentrates under conditions designed to extract precious metals. The precious metals are recovered in this instance in the copper concentrate enrichment process resulting in a copper concentrate that is also enriched in precious metals.

FIG. 2 shows an alternate embodiment, in which the metathetic copper concentrate enrichment process is combined with the precious metal recovery step. The precious metals are reduced into the copper concentrate by the reaction of the dissolved precious metal (for example as sodium or acid chloride complexes), in accordance with the following putative reactions:

$$2NaAuCl_4 + 3CuFeS_2 = 2Au + 3CuS + 3FeCl_2 + 2NaCl + 3S$$

$$2HAuCl_4 + 3CuFeS_2 = 2Au + 3CuS + 3FeCl_2 + 2HCl + 3S$$

$$Na_2PdCl_4 + CuFeS_2 = Pd + CuS + FeCl_2 + 2NaCl + S$$

$$H_2PdCl_4 + CuFeS_2 = Pd + CuS + FeCl_2 + 2HCl + S$$

$$Na_2PtCl_6 + 2CuFeS_2 = Pt + 2CuS + 2FeCl_2 + 2NaCl + 2S$$

$$H_2PtCl_6 + 2CuFeS_2 = Pt + 2CuS + 2FeCl_2 + 2HCl + 2S$$

In the alternative embodiment of FIG. 2, the copper concentrate is enriched in both copper and precious metals, whilst being depleted of other metals, such as iron, nickel and/or cobalt.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the examples and drawings.

EXAMPLES

Example 1

Copper Concentrate Enrichment by Contact with a Synthetic Nickel-Copper Leach Solution A copper concentrate obtained from a copper-nickel bulk cleaner flotation circuit with a copper/nickel separation process was contacted with a synthetic nickel-copper leach solution. The copper concentrate had the analysis shown in the table below.

TABLE 1

| Copper concentrate analysis | | | | | |
|---|---|---|---|---|---|
| | Analysis (%) | | | | |
| | Cu | Ni | Co | Fe | S |
| Copper Concentrate | 22.8 | 0.47 | 0.035 | 31.9 | 28.7 |

160 g of copper concentrate (dry basis) were contacted with 1200 mL of nickel-copper leach solution containing 10 g/L Cu, 15 g/L Ni, 1.9 g/L Fe and 102 g/L $H_2SO_4$. Contact was performed in a stirred reactor for 8 hours at 100 C. The solution was sampled during the course of the test and after 8 hours the remaining solids were filtered and washed.

TABLE 2

| Copper Concentrate Enrichment Test Results | | | | | | | |
|---|---|---|---|---|---|---|---|
| | Amount | $H_2SO_4$ | Assay (g/L or % for solids) | | | | |
| Product | (mL, g) | (g/L) | Cu | Ni | Fe | Co | S |
| 0.5 h soln | 40 | 75 | 10.9 | 15.9 | 5.0 | | |
| 1 h soln | 39 | 74 | 10.1 | 15.6 | 5.4 | | |
| 2 h soln | 39 | 74 | 5.97 | 15.8 | 8.52 | | |
| 4 hr soln | 37 | 72 | 1.06 | 15.2 | 11.6 | | |
| 8 hr soln | 1113 | 68 | 0.0002 | 14.8 | 12.8 | | |
| Wash soln | 700 | | 0.13 | 1.18 | 1.04 | | |
| Enriched Concentrate | 150 | | 30.7 | 0.41 | 24.4 | 0.031 | 27.8 |

The copper concentrate was enriched from 22.8 to 30.7% Cu whilst the Ni, Fe and Co were reduced to 0.41, 24.4 and 0.031% respectively. The enriched copper concentrate was regarded as highly saleable due to the +25% Cu content and reduced nickel contamination. Virtually all the copper in solution was removed into the solid phase by the enrichment process by the end of the 8 hr period demonstrating the effectiveness of the copper concentrate enrichment process.

Example 2

Nickel-Copper Concentrate Hydrometallurgical Extraction Followed by Copper Concentrate Enrichment by Contact with the Nickel-Copper Leach Solution A sample of nickel-copper concentrate was obtained from a flotation test in which a bulk copper-nickel concentrate was subjected to copper-nickel separation. The copper rougher tails and the copper cleaner scavenger tails were combined to form the nickel-copper concentrate. The nickel concentrate had the analysis shown in the table below.

TABLE 3

| Nickel-Copper Concentrate Analysis | | | | | | | | | |
|---|---|---|---|---|---|---|---|---|---|
| | Analysis (% or g/t) | | | | | | | | |
| | Cu | Ni | Co | Fe | S | S²⁻ | Mg | Pt | Pd | Au |
| Nickel-Copper Concentrate | 4.82 | 4.78 | 0.25 | 37.8 | 25.1 | 22.0 | 1.89 | 4.06 | 12.4 | 0.71 |

A pressure leach of the nickel-copper concentrate was conducted under PLATSOL™ leach conditions of 225 C, 100 psig $O_2$, 10 g/L Cl addition for 120 minutes in a 2 L PARR titanium autoclave. A total of 200 g of nickel-copper concentrate was mixed with 1032 mL of solution containing (initially) 11 g/L $H_2SO_4$, 12 g/L Ni, 0.58 g/L Cu, 1.78 g/L Fe, 1.9 g/L Zn, 1.8 g/L Mg, 4.4 g/L Al and 6.4 g/L Na.

The products of the PLATSOL™ testing were
(a) 1025 mL of solution analyzing 71 g/L $H_2SO_4$, 21.5 g/L Ni, 10.5 g/L Cu, 11.2 g/L Fe, 2.1 g/L Zn, 0.49 g/L Co, 4.0 g/L Mg, 1.3 g/L Al, 1.84 g/L Na, 0.09 mg/L Au, 0.65 mg/L Pt and 2.0 mg/L Pd.
(b) 700 mL of wash solution containing 3.95 g/L Ni and 1.99 g/L Cu
(c) 196 g of leach residue containing 0.12% Ni, 0.027% Cu, 30.1% Fe, 0.04% Zn, <0.002% Co, 0.73% Mg, 3.39% Al, 0.14 g/t Au, 0.13 g/t Pt and 0.47 g/t Pd.

Based on these values, the extraction of various elements was calculated to be 97.5% Ni, 99.5% Cu, 99.2% Co, 80.7% Au, 96.9% Pt and 96.3% Pd. The calculation was based on a comparison of concentrate feed to residue analysis.

A copper concentrate obtained from a copper-nickel bulk cleaner flotation circuit with a copper/nickel separation process was contacted with a portion of the PLATSOL™ leach extraction produced by the method above. The copper concentrate had the analysis shown in the table below.

TABLE 4

| Copper Concentrate Analysis with Precious Metals Values | | | | | | | | |
|---|---|---|---|---|---|---|---|---|
| | Analysis (% or g/t) | | | | | | | |
| | Cu | Ni | Co | Fe | S | Au | Pt | Pd |
| Copper Concentrate | 22.8 | 0.47 | 0.035 | 31.9 | 28.7 | 2.0 | 1.6 | 6.0 |

108 g of copper concentrate (dry basis) were contacted with 780 mL of PLATSOL™ leach solution. Contact was performed in a stirred reactor for 8 hours at 100 C. The solution was sampled during the course of the test and after 8 hours the remaining solids were filtered and washed.

TABLE 5

| Copper Concentrate Enrichment Test Results with Precious Metals in Solution | | | | | | | | | | |
|---|---|---|---|---|---|---|---|---|---|---|
| | Amount | $H_2SO_4$ | Assay (g/L or % or g/t for solids) | | | | | | | |
| Product | (mL, g) | (g/L) | Cu | Ni | Fe | Co | S | Au | Pt | Pd |
| 0.5 h soln | 29 | 65 | 13.8 | 21.6 | 16.6 | 0.44 | | | | |
| 1 h soln | 23 | 65 | 13.2 | 21.0 | 16.4 | 0.42 | | | | |
| 2 h soln | 29 | 65 | 11.7 | 21.0 | 17.5 | 0.44 | | | | |
| 4 hr soln | 29 | 65 | 5.67 | 21.7 | 22.3 | 0.45 | | | | |
| 8 hr soln | 594 | 66 | 0.001 | 21.8 | 27.2 | 0.45 | | <0.01 | <0.01 | <0.01 |
| Wash soln | 970 | | 0.012 | 0.87 | 1.08 | 0.019 | | | | |
| Enriched Concentrate | 98 | | 32.3 | 0.45 | 23.3 | 0.037 | 30.8 | 2.84 | 6.36 | 22.8 |

The copper concentrate was enriched from 22.8 to 32.3% Cu whilst the Ni and Fe were reduced to 0.45 and 23.3% respectively. The enriched copper concentrate was regarded as highly saleable due to the +25% Cu content and reduced nickel contamination. The precious metal grade was enriched from 2.0 to 2.84 g/t Au, 1.2 to 6.36 g/t Pt and 6.0 to 22.8 g/t Pd.

Example 3

Copper Concentrate Enrichment with a Precious Metal Free Solution Derived from Hydrometallurgical Treatment of a Nickel-Copper Concentrate Obtained Via Combination of a Copper Rougher Tail and a Copper Cleaner Tail Concentrate Product A sample of nickel-copper concentrate derived from a bulk cleaner flowsheet with combination of copper rougher tails and copper cleaner scavenger tails was subjected to a continuous leach process under PLATSOL™™ process conditions. The continuous leach process was conducted in a 6 compartment titanium autoclave with an average temperature of 224 C, 100 psig of oxygen, 8.5 g/L Cl, 64 minutes of average retention time with 96% recycling of autoclave residue solids to the feed. The composition of the concentrate is shown below.

TABLE 6

Nickel-Copper Flotation Concentrate Assay

| | Analysis (% or g/t) | | | | | | | | | |
|---|---|---|---|---|---|---|---|---|---|---|
| | Cu | Ni | Co | Fe | S | $S^{2-}$ | Mg | Pt | Pd | Au |
| Nickel-Copper Concentrate | 5.66 | 3.44 | 0.18 | 34.7 | 24.4 | 23.3 | 1.91 | 3.35 | 10.3 | 0.9 |

The nickel-copper flotation concentrate was formed into a slurry with water to approximately 57% solids on a weight basis. During the continuous PLATSOL™ testing, the solid content was further modified with an autoclave dilution solution of the composition shown in Table 7. The final feed solids content was approximately 9.5% weight. The diluted slurry was formulated to approximate the required solid-liquid composition required to provide autothermal operation of the PLATSOL™ process under commercial autoclave conditions. Oxygen was added continuously and in excess during the continuous PLATSOL™ testing with excess oxygen removed by venting of the autoclave.

TABLE 7

Dilution Solution Composition for forming the Autoclave Feed Slurry

| Ni (g/L) | Cu (g/L) | Fe (g/L) | Co (g/L) | Mg (g/L) | Au (mg/L) | Pt (mg/L) | Pd (mg/L) |
|---|---|---|---|---|---|---|---|
| 20.6 | 0.001 | 0.002 | 0.88 | 4.0 | <0.01 | <0.01 | <0.01 |

During the course of a 10 hour period, the discharge slurry from the autoclave was sampled every two hours in order to observe the progress of the PLATSOL™ process. The solid and liquid analyses are shown in Tables 8 and 9 below.

TABLE 8

Autoclave Discharge Residue Sample Analyses

| | Analysis (% or g/t) | | | | | | | | |
|---|---|---|---|---|---|---|---|---|---|
| | Cu | Ni | Co | Fe | $S^{2-}$ | Mg | Pt | Pd | Au |
| 0 h sample | 0.06 | 0.40 | 0.01 | | 2.33 | | | | |
| 2 h sample | 0.06 | 0.21 | 0.006 | 43.4 | 1.50 | 1.50 | 1.75 | 3.40 | 0.33 |
| 4 h sample | 0.069 | 0.12 | 0.005 | 40.9 | 1.29 | 1.48 | 0.84 | 1.52 | 0.10 |
| 6 h sample | 0.056 | 0.13 | 0.004 | 41.6 | 1.19 | 1.45 | 0.67 | 1.45 | 0.11 |
| 8 h sample | 0.059 | 0.12 | 0.004 | 42.0 | 1.22 | 1.64 | 0.42 | 0.77 | 0.09 |
| 10 h sample | 0.064 | 0.12 | 0.004 | 41.0 | 1.34 | 1.43 | 0.40 | 0.74 | 0.09 |

TABLE 9

Autoclave Discharge Solution Sample Analyses

| | Analysis (g/L or mg/L) | | | | | | | | |
|---|---|---|---|---|---|---|---|---|---|
| | $H_2SO_4$ | Cu | Ni | Co | Fe | Mg | Pt | Pd | Au |
| 0 h sample | 43 | 5.09 | 16.1 | 0.72 | 0.46 | 3.00 | 0.07 | 0.32 | 0.04 |
| 2 h sample | 53 | 7.22 | 22.6 | 0.98 | 1.48 | 4.00 | 0.12 | 0.67 | 0.07 |
| 4 h sample | 56 | 7.58 | 23.1 | 1.10 | 1.51 | 4.60 | 0.22 | 0.94 | 0.09 |
| 6 h sample | 59 | 8.27 | 24.9 | 1.10 | 2.09 | 5.50 | 0.24 | 1.02 | 0.08 |
| 8 h sample | 59 | 8.26 | 24.3 | 1.10 | 1.51 | 5.50 | 0.33 | 1.26 | 0.09 |
| 10 h sample | 49 | 6.44 | 25.5 | 1.20 | 0.85 | 5.80 | 0.27 | 0.93 | 0.07 |

Metal extractions through the PLATSOL™ Process were calculated based on feed and residue analyses with an adjustment for mass loss or gain. The extractions are reported in Table 10.

TABLE 10

PLATSOL™ Metal Extraction

| Extraction (%) | | | | | | | |
|---|---|---|---|---|---|---|---|
| Ni | Cu | Fe | Co | Mg | Au | Pt | Pd |
| 97.0 | 99.1 | −0.4 | 98.1 | 33.8 | 91.0 | 87.6 | 92.0 |

The product solution from the PLATSOL™ process was recovered by filtration and washing of the solids. The solution was then forwarded to iron reduction with sulfur dioxide gas injection and precious metal precipitation with a precipitate of CuS.

The precious metal precipitation circuit consisted of a preheat tank, an $SO_2$ reduction tank (PGM1) and 2 PGM precipitation tanks (PGM2 and PGM3).

The PGM preheat tank was used to preheat PLATSOL™ solution to 95° C. In PGM1 ferric iron was reduced by addition of sufficient SO2 gas to form ferrous iron. In tank PGM2 synthetically produced CuS solids were pumped in to maintain a target 10 g/L CuS concentration. Dissolved PGMs precipitated onto the CuS in tanks PGM2 and PGM3 and were filtered straight onto Buchner filters. Filtered PGM3 solids were repulped in PGM3 filtrate and recycled to PGM2 to reduce the flow of fresh CuS into the circuit. The target level of 10 g/L CuS was maintained throughout, of which 90% was recycled CuS.

The analysis of combined PLATSOL™ solution used for this test is summarized in Table 11 while the synthetic CuS analysis is shown in Table 12.

TABLE 11

Combined PLATSOL™ solution for Precious Metal Removal
Analysis (g/L or mg/L)

| Cu | Ni | Co | Fe | Mg | Pt | Pd | Au |
|---|---|---|---|---|---|---|---|
| 7.50 | 23.0 | 1.10 | 1.97 | 4.80 | 0.18 | 0.72 | 0.05 |

TABLE 12

Synthetic CuS Composition
Analysis (% or g/t)

| Cu | Ni | Co | Fe | $S^{2-}$ | Mg | Pt | Pd | Au |
|---|---|---|---|---|---|---|---|---|
| 63.2 | 0.004 | <0.002 | 0.01 | 29.9 | <0.003 | <0.02 | 0.4 | 0.07 |

Table 13 summarizes the analysis of the product solutions from the precious metals precipitation circuit. Table 14 shows the analysis of the solids formed with the precipitation of precious metals.

TABLE 13

Solution Samples from Precious Metal Removal

Analysis (g/L or mg/L)

| Sample | Cu | Ni | Co | Fe | Mg | Pt | Pd | Au |
|---|---|---|---|---|---|---|---|---|
| Sample 1 | 6.10 | 18.0 | 0.88 | 2.40 | 3.90 | 0.01 | <0.01 | <0.01 |
| Sample 2 | 6.70 | 20.0 | 0.92 | 2.00 | 4.30 | <0.01 | <0.01 | <0.01 |

TABLE 14

Solid Samples from Precious Metal Removal

Analysis (% or g/t)

| Sample | Cu | Ni | Co | Fe | $S^{2-}$ | Mg | Pt | Pd | Au |
|---|---|---|---|---|---|---|---|---|---|
| Sample 1 | 61.2 | 0.0 | <0.002 | 0.10 | 30.9 | 0.01 | 25 | 4 | 67 |
| Sample 2 | NA | NA | NA | NA | NA | NA | 28 | 5 | 85 |

NA—Not Analyzed

In the copper enrichment stage, copper concentrate was mixed with PGM3 filtrate. The amount of copper concentrate added was calculated based on the relative amounts of copper and nickel-copper concentrates from flotation. A ratio of 0.8 copper concentrate to 1.0 nickel-copper concentrate was established. This ratio was further used to specify a solution volume addition per mass of copper concentrate based on the solution volumes produced in PLATSOL™ and Precious Metal removal testing. A recycle corresponding to 0.5 to 0.7 t of enriched copper concentrate per t of fresh copper concentrate was established to maximize the kinetics and extent of the copper concentrate enrichment process. A total of 3 continuous tanks with a combined retention time of 7.2 h were used in this circuit. The copper concentrate analysis is shown in Table 15. Table 16 and 17 show the results for copper concentrate enrichment and copper in solution depletion. Table 16 indicates that the copper content of the solids is enriched while the iron content in particular is decreased (compare Table 15 and 16 values). The copper in solution has decreased to as low as 0.29 g/L in the second sample (Table 17) compared with +6 g/L Cu in Table 13 which conforms to +95% removal of copper from solution as the copper concentrate is enriched. These results all support the development of the copper concentrate enrichment process.

TABLE 15

Copper Concentrate Analysis with Precious Metals Values

Analysis (% or g/t)

| | Cu | Ni | Co | Fe | S | Au | Pt | Pd |
|---|---|---|---|---|---|---|---|---|
| Copper Concentrate | 30.5 | 0.38 | 0.018 | 33.5 | 32.7 | 1.32 | 1.13 | 5.76 |

TABLE 16

Copper Concentrate Enrichment Test Results for Solids

Analysis (% or g/t)

| | Cu | Ni | Co | Fe | S | Au | Pt | Pd |
|---|---|---|---|---|---|---|---|---|
| Sample 1 | 31.2 | 0.31 | 0.02 | 24.3 | 31.0 | 1.3 | 1.1 | 5.2 |
| Sample 2 | 30.7 | 0.39 | 0.02 | 30.3 | 31.6 | 1.7 | 1.5 | 6.4 |

TABLE 17

Solution Analyses from Copper Concentrate Enrichment

Analysis (g/L or mg/L)

| Sample | $H_2SO_4$ | Cu | Ni | Co | Fe | Mg | Pt | Pd | Au |
|---|---|---|---|---|---|---|---|---|---|
| Sample 1 | 38 | 1.60 | 17.0 | 0.89 | 8.80 | 4.50 | <0.01 | <0.01 | <0.01 |
| Sample 2 | 41 | 0.290 | 17.0 | 0.86 | 8.90 | 4.10 | <0.01 | <0.01 | <0.01 |

Example 4

Copper Concentrate Enrichment with a Precious Metal Free Solution Derived from Hydrometallurgical Treatment of a Nickel-Copper Concentrate Corresponding to a Scavenger Concentrate Obtained from a Split Cleaner Flowsheet A sample of nickel-copper concentrate derived from a split cleaner flowsheet (the scavenger concentrate) was subjected to a continuous leach process under PLATSOL™™ process conditions. The continuous leach process was conducted in a 6 compartment titanium autoclave with an average temperature of 225 C, 100 psig of oxygen, 9.6 g/L Cl, 119 minutes of average retention time with 111% recycling of autoclave residue solids to the feed. The composition of the concentrate is shown below.

TABLE 18

Nickel-Copper Flotation Concentrate Assay

Analysis (% or g/t)

| | Cu | Ni | Co | Fe | S | $S^{2-}$ | Mg | Pt | Pd | Au |
|---|---|---|---|---|---|---|---|---|---|---|
| Scavenger Concentrate | 2.17 | 0.80 | 0.04 | 32.4 | 25.3 | 23.2 | 2.07 | 0.97 | 3.32 | 0.62 |

The nickel-copper flotation concentrate was formed into a slurry with water to approximately 51% solids on a weight basis. During the continuous PLATSOL™ testing, the solid content was further modified with an autoclave dilution solution of the composition shown in Table 19. The final feed solids content was approximately 9.2% weight. The diluted slurry was formulated to approximate the required solid-liquid composition required to provide autothermal operation of the PLATSOL™ process under commercial autoclave conditions. Oxygen was added continuously and in excess during the continuous PLATSOL™ testing with excess oxygen removed by venting of the autoclave.

TABLE 19

Dilution Solution Composition for forming the Autoclave Feed Slurry

| Ni (g/L) | Cu (g/L) | Fe (g/L) | Co (g/L) | Mg (g/L) | Au (mg/L) | Pt (mg/L) | Pd (mg/L) |
|---|---|---|---|---|---|---|---|
| 5.29 | 0.0003 | 0.003 | 0.210 | 4.0 | <0.01 | <0.01 | <0.01 |

During the course of a 14 hour period, the discharge slurry from the autoclave was sampled every two hours in order to observe the progress of the PLATSOL™ process. The solid and liquid analyses are shown in Tables 20 and 21 below.

TABLE 20

Autoclave Discharge Residue Sample Analyses

Analysis (% or g/t)

| | Cu | Ni | Co | Fe | $S^{2-}$ | Mg | Pt | Pd | Au |
|---|---|---|---|---|---|---|---|---|---|
| 0 h sample | 0.063 | 0.12 | 0.004 | 43.8 | 1.32 | 1.41 | 0.38 | 0.67 | 0.10 |
| 2 h sample | 0.053 | 0.11 | 0.004 | 43.3 | 1.28 | 1.32 | 0.18 | 0.35 | 0.14 |
| 4 h sample | 0.037 | 0.083 | 0.003 | 44.8 | 1.23 | 1.19 | 0.11 | 0.21 | 0.13 |

TABLE 20-continued

Autoclave Discharge Residue Sample Analyses

Analysis (% or g/t)

| | Cu | Ni | Co | Fe | $S^{2-}$ | Mg | Pt | Pd | Au |
|---|---|---|---|---|---|---|---|---|---|
| 6 h sample | 0.031 | 0.065 | 0.003 | 44.3 | 1.09 | 1.19 | 0.10 | 0.20 | 0.15 |
| 8 h sample | 0.027 | 0.055 | 0.002 | 44.9 | 1.02 | 1.19 | 0.09 | 0.21 | 0.15 |
| 10 h sample | 0.027 | 0.058 | 0.002 | 45.6 | 0.85 | 1.17 | 0.09 | 0.20 | 0.16 |
| 12 h sample | 0.028 | 0.051 | 0.002 | 45.7 | 0.80 | 1.18 | 0.07 | 0.20 | 0.14 |
| 14 h sample | 0.041 | 0.046 | 0.002 | 46.2 | 0.91 | 1.13 | 0.08 | 0.18 | 0.13 |

TABLE 21

Autoclave Discharge Solution Sample Analyses

Analysis (g/L or mg/L)

| | $H_2SO_4$ | Cu | Ni | Co | Fe | Mg | Pt | Pd | Au |
|---|---|---|---|---|---|---|---|---|---|
| 0 h sample | 50 | 7.09 | 24.5 | 1.20 | 1.49 | 5.10 | 0.30 | 1.08 | 0.08 |
| 2 h sample | 56 | 6.66 | 21.5 | 0.94 | 1.43 | 5.30 | 0.28 | 0.96 | 0.06 |
| 4 h sample | 59 | 5.30 | 15.6 | 0.71 | 2.81 | 5.60 | 0.25 | 0.89 | 0.06 |
| 6 h sample | 63 | 4.88 | 12.8 | 0.56 | 4.74 | 6.20 | 0.23 | 0.81 | 0.06 |
| 8 h sample | 73 | 5.11 | 11.5 | 0.50 | 6.66 | 7.10 | 0.20 | 0.72 | 0.07 |
| 10 h sample | 70 | 4.81 | 9.45 | 0.43 | 7.24 | 7.00 | 0.17 | 0.62 | 0.06 |
| 12 h sample | 71 | 4.74 | 8.59 | 0.40 | 6.91 | 6.90 | 0.16 | 0.60 | 0.07 |
| 14 h sample | 67 | 4.45 | 7.74 | 0.36 | 5.52 | 6.40 | 0.17 | 0.64 | 0.08 |

Metal extractions through the PLATSOL™ Process were calculated based on feed and residue analyses with an adjustment for mass loss or gain. The extractions are reported in Table 22.

TABLE 22

PLATSOL ™ Metal Extraction

Extraction (%)

| Ni | Cu | Fe | Co | Mg | Au | Pt | Pd |
|---|---|---|---|---|---|---|---|
| 95.5 | 99.0 | 3.7 | 96.7 | 61.4 | 84.0 | 94.2 | 95.9 |

The product solution from the PLATSOL™ process was recovered by filtration and washing of the solids. The solution was then forwarded to iron reduction with sulfur dioxide gas injection and precious metal precipitation with a precipitate of CuS.

The precious metal precipitation circuit consisted of a preheat tank, an $SO_2$ reduction tank (PGM1) and 2 PGM precipitation tanks (PGM2 and PGM3).

The PGM preheat tank was used to preheat PLATSOL™™ solution to 95° C. In PGM1 ferric iron was reduced by addition of sufficient SO2 gas to form ferrous iron. In tank PGM2 synthetically produced CuS solids were pumped in to maintain a target 10 g/L CuS concentration. Dissolved PGMs precipitated onto the CuS in tanks PGM2 and PGM3 and were filtered straight onto Buchner filters. Filtered PGM3 solids were repulped in PGM3 filtrate and recycled to PGM2 to reduce the flow of fresh CuS into the circuit. The target level of 10 g/L CuS was maintained throughout, of which ~90% was recycled CuS.

The analysis of combined PLATSOL™ solution used for this test is summarized in Table 23 while the synthetic CuS analysis is shown in Table 24.

TABLE 23

Combined PLATSOL ™ solution for Precious Metal Removal

Analysis (g/L or mg/L)

| Cu | Ni | Co | Fe | Mg | Pt | Pd | Au |
|---|---|---|---|---|---|---|---|
| 4.80 | 11.0 | 0.54 | 5.50 | 6.60 | 0.20 | 0.63 | 0.04 |

TABLE 24

Synthetic CuS Composition

Analysis (% or g/t)

| Cu | Ni | Co | Fe | $S^{2-}$ | Mg | Pt | Pd | Au |
|---|---|---|---|---|---|---|---|---|
| 63.2 | 0.004 | <0.002 | 0.01 | 29.9 | <0.003 | <0.02 | 0.4 | 0.07 |

Table 25 summarizes the analysis of the product solutions from the precious metals precipitation circuit. Table 26 shows the analysis of the solids formed with the precipitation of precious metals.

TABLE 25

Solution Samples from Precious Metal Removal

Analysis (g/L or mg/L)

| Sample | Cu | Ni | Co | Fe | Mg | Pt | Pd | Au |
|---|---|---|---|---|---|---|---|---|
| Sample 1 | 6.50 | 18.0 | 0.84 | 3.10 | 5.40 | <0.01 | 0.01 | <0.01 |
| Sample 2 | 5.30 | 13.0 | 0.58 | 4.90 | 6.10 | <0.01 | <0.01 | <0.01 |
| Sample 3 | 4.80 | 12.0 | 0.55 | 5.30 | 6.40 | 0.01 | 0.01 | 0.01 |

TABLE 26

Solid Samples from Precious Metal Removal

Analysis (% or g/t)

| Sample | Cu | Ni | Co | Fe | $S^{2-}$ | Mg | Pt | Pd | Au |
|---|---|---|---|---|---|---|---|---|---|
| Sample 1 | 42.7 | 0.10 | 0.004 | 0.20 | 20.3 | 0.02 | 66 | 170 | 11 |
| Sample 2 | 59.6 | 0.0 | <0.002 | 0.60 | 28.1 | 0.01 | 90 | 244 | 16 |

In the copper enrichment stage, copper concentrate was mixed with PGM3 filtrate. The amount of copper concentrate added was calculated based on the relative amounts of copper and nickel-copper concentrates from flotation. A ratio of 1.0 copper concentrate to 1.0 nickel-copper concentrate was established. This ratio was further used to specify a solution volume addition per mass of copper concentrate based on the solution volumes produced in PLATSOL™ and Precious Metal removal testing. A recycle corresponding to 0.5 to 0.7 t of enriched copper concentrate per t of fresh copper concentrate was established to maximize the kinetics and extent of the copper concentrate enrichment process. A total of 3 continuous tanks with a combined retention time of 7.2 h were used in this circuit. The copper concentrate analysis is shown in Table 27. Table 28 and 29 show the results for copper concentrate enrichment and copper in solution depletion. Table 28 indicates that the copper content of the solids is enriched while the iron content in particular is decreased (compare Table 27 and 28 values). The copper in solution has decreased to as low as 0.24 g/L in the second sample (Table 29) compared with +4.8 g/L Cu in Table 25 which conforms to +95% removal of copper from solution as the copper concentrate is enriched. These results all support the development of the copper concentrate enrichment process.

TABLE 27

Copper Concentrate Analysis with Precious Metals Values

Analysis (% or g/t)

| | Cu | Ni | Co | Fe | S | Au | Pt | Pd |
|---|---|---|---|---|---|---|---|---|
| Copper Concentrate | 30.5 | 0.64 | 0.025 | 31.5 | 31.1 | 1.60 | 1.44 | 9.24 |

TABLE 28

Copper Concentrate Enrichment Test Results for Solids

Analysis (% or g/t)

| | Cu | Ni | Co | Fe | S | Au | Pt | Pd |
|---|---|---|---|---|---|---|---|---|
| Sample 1 | 30.7 | 0.39 | 0.02 | 30.3 | 31.6 | 1.70 | 1.50 | 6.40 |
| Sample 2 | 30.5 | 0.52 | 0.02 | 28.5 | 32 | 1.60 | 1.30 | 7.70 |
| Sample 3 | 29.7 | 0.55 | 0.03 | 29.4 | 32.7 | 1.60 | 1.30 | 8.5 |

TABLE 29

Solution Analyses from Copper Concentrate Enrichment

| Sample | $H_2SO_4$ | Cu | Ni | Co | Fe | Mg | Pt | Pd | Au |
|---|---|---|---|---|---|---|---|---|---|
| | | | | Analysis (g/L or mg/L) | | | | | |
| Sample 1 | 41 | 0.29 | 17.0 | 0.86 | 8.90 | 4.10 | <0.01 | <0.01 | <0.01 |
| Sample 2 | 50 | 0.24 | 15.0 | 0.67 | 9.30 | 4.90 | <0.01 | <0.01 | <0.01 |
| Sample 3 | 50 | 0.25 | 11.0 | 0.48 | 9.80 | 5.80 | <0.01 | <0.01 | <0.01 |

REFERENCES

Dreisinger, D. B., "Copper Leaching from Primary Sulfides: Options for Biological and Chemical Leaching of Copper", Hydrometallurgy 83 (2006) 10-20.

Dreisinger, D., Baxter, K., Wardell-Johnson, M., "The Recovery of Nickel and Cobalt from the NorthMet Deposit Using the PLATSOL™ Process with Production of Mixed or Separate Nickel and Cobalt Hydroxides", To appear in Nickel-Cobalt 2009 Proceedings, Sudbury, August 2009, CIM (Montreal).

Dreisinger, D., "Hydrometallurgical Process Development for Complex Ores and Concentrates", Proceedings of Hydrometallurgy 2009, Johannesburg, March 2009, South African Institute of Mining and Metallurgy (INVITED PLENARY LECTURE).

Dreisinger, D., Murray, W., "Metallurgical Development of the NorthMet Deposit of PolyMet Mining for Recovery of Copper, Nickel, Cobalt and Precious Metals", Proceedings of ALTA Nickel—Cobalt Conference, ALTA Metallurgical, Perth, Australia, June 2008, 19 pages.

Dreisinger, D. B., Baxter, K., Fleming, C., Ferron, J., Mezei, A., Brown, J. and Molnar, R. "Hydrometallurgical Processing of PolyMet Mining's NorthMet Deposit for the Recovery of Cu—Ni—Co—Zn—Pd, Pt, Au", Proceedings of Copper 2007—Cobre 2007, Volume IV (Book 1), Eds. Riveros, P, Collins, M., Dreisinger, D, Dixon, D., CIM Metsoc, Montreal, pp. 43-60.

Dreisinger, D., Murray, W., Hunter, D., Baxter, K., Wardell-Johnson, M., Langley, A I, Liddicoat, J., Fleming, C. A., Ferron, C. J., Mezei, A., Brown, J., Molnar, R. and Imeson, D., "Metallurgical Processing of PolyMet Mining's North-Met Deposit for Recovery of Cu—Ni—Co—Zn—Pd—Pt—Au", Proceedings of the ALTA World Forum on Nickel and Cobalt Hydrometallurgy, Perth Australia, 20 pages, ALTA Metallurgical Services, Australia, 2006.

Dreisinger, D., Murray, W., Hunter, D., Baxter, K., Ferron, C. J. and Fleming, C. A., "The Application Of The Platsol™ Process To Copper-Nickel-Cobalt-Pge/Pgm Concentrates From Polymet Mining's Northmet Deposit", Proceedings of the ALTA World Forum on Nickel and Cobalt Hydrometallurgy, Perth Australia, 16 pages, ALTA Metallurgical Services, Australia, 2005.

Ferron, C. J.; Fleming, C. A.; O'Kane, P. T.; Dreisinger, D. High temperature chloride assisted leach process to extract simultaneously Cu, Ni, Au and the PGM's from various feedstocks. Chloride Metallurgy 2002: Practice and Theory of Chloride/Metal Interaction, Annual Hydrometallurgy Meeting, 32nd, Montreal, QC, Canada, Oct. 19-23, 2002 (2002), 1 11-28.

Ferron, C. J., Fleming, C. A., Dreisinger, D. B. and O'Kane, P. T., "Application of the PLATSOL Process to Copper-Gold Concentrates", Presented at the Randol Copper Hydromet Roundtable, Sep. 5-8, 2000, Tucson, Ariz.

Ferron, C. J., Fleming, C. A., Dreisinger, D. B., O'Kane P. T., "Single Step Pressure Leaching of Base and Precious Metals (gold and PGM's) Using the PLATSOL Process", Proceedings of Alta Nickel Conference (Alta 2000), May 15-18, 2000, ALTA (Australia), 21 pages.

Ferron, C. J., Fleming, C. A., Dreisinger, D. B., O'Kane P. T., "One Step Leaching of Gold, PGM's and Base Metals from Various Ores and Concentrates", Proceedings of Randol Au and Ag Forum—Vancouver, Apr. 25-28, 2000, Randol International (Golden), 243-252.

Ferron, C. J., Fleming, C. A., O'Kane P. T., Dreisinger, D. B., "Pilot Plant Demonstration of the PLATSOL Process for the Treatment of the Northmet Copper-Nickel-PGM Deposit", Presented at the 2001 SME Annual Meeting and Exhibit, Feb. 26-28, 2001, Denver Colo., 22 pages.

Fleming, C. A., Ferron, C. J., Dreisinger, D. B. and O'Kane, P. T., "A Process for the Simultaneous Leaching and Recovery of Gold, Platinum Group Metals and Base Metals from Ores and Concentrates", EPD Proceedings 2000, Ed. Patrick Taylor, TMS, Warrendale, (2000), 419-431.

Dreisinger, D. B., Fleming, C. A., Ferron, C. J. and O'Kane, P. T., "The Hydrometallurgical Treatment of Base Metal Sulphide Concentrates Containing Precious and Platinum Group Metals", Proceedings of Minprex 2000, Ed. D. Swinbourne, AusIMM (2000), 49-55.

The invention claimed is:

1. A process for producing an enriched copper concentrate and precious metals from a copper-and-nickel-containing ore having precious metal values, the process comprising:
   comminuting the ore to provide a ground ore comprising copper minerals and nickel minerals;
   subjecting the ground ore to a floatation process, to separate the ground ore into a first concentrate comprising a concentration of copper-enriched-and-nickel-containing solids and a second concentrate comprising a concentration of nickel-enriched-and-copper-containing solids, wherein the concentration of the copper minerals is higher in the first concentrate than in the ore and the concentration of the nickel minerals is higher in the second concentrate than the ore;
   subjecting the second concentrate to a hydrometallurgical extraction, to extract a copper-containing leachate from the second concentrate; wherein the hydrometallurgical extraction comprises pressure oxidation in the presence of a halide salt to dissolve copper and nickel as soluble metal sulphate salts and precious metals as chloro-complexed species;
   recovering the precious metals from the copper-containing leachate; and,
   exposing the first concentrate to the copper-containing leachate under metathetic leaching conditions that are effective to increase the concentration of copper, and decrease the concentration of nickel, in the copper-enriched-and-nickel-containing solids, to provide the enriched copper concentrate.

2. The process of claim 1, wherein the copper mineral and nickel minerals are selected from the group consisting of: CuS, covellite; Cu9S8 (Cu1.12S), yarrowite; Cu39S28 (Cu1.39S) spionkopite; Cu8S5 (Cu1.6S), geerite; Cu7S4 (Cu1.75S), anilite; Cu9S5 (Cu1.8S), digenite; Cu31S16 (Cu1.96S), djurleite; Cu2S, chalcocite; CuFeS2, Chalcopyrite; Cu5FeS4, Bornite; CuFe2S3, Cubanite; Ni3S4, Polydymite; NiS, Millerite; Ni3S2, Heazelwoodite; FeNi2S4, Violarite; Ni4.5Fe4.5S8, Pentlandite; Fe(Ni)7S8, Nickeliferrous; and Pyrrhotite.

3. The process of claims 1 or 2, wherein the precious metals are recovered by precipitation with a reduced sulfide mineral.

4. The process of claims 1 or 2, wherein the precious metals are selected from the group consisting of: Au, Pt, Pd, Rh, Ir, Ru, Os and Ag.

5. The process of any one of claims 1 or 2, wherein the comminuting results in an average particle size of the copper-enriched-and-nickel-containing solids subjected to the metathetic leaching conditions is less than 100 µm.

6. The process of any one of claims 1 or 2, wherein the comminuting results in an average particle size of the copper-enriched-and-nickel-containing solids subjected to the metathetic leaching conditions is in the range of 5-30 µm.

7. The process of any one of claims 1 or 2, wherein the metathetic leaching conditions comprise an average temperature in the range of ambient temperature to boiling point.

8. The process of any one of claims 1 or 2, wherein the metathetic leaching conditions comprise an average temperature above boiling point.

9. The process of any one of claims 1 or 2, wherein the metathetic leaching conditions are maintained for a metathetic leaching time in the range of 2 to 12 hours.

\* \* \* \* \*